(12) United States Patent
Parasurama et al.

(10) Patent No.: US 9,988,014 B2
(45) Date of Patent: Jun. 5, 2018

(54) METHODS AND APPARATUS FOR IMPEDING A VEHICLE ENTRY SYSTEM RELAY ATTACK

(71) Applicant: Honda Motor Co., Ltd., Tokyo (JP)

(72) Inventors: Bharath Kumar Parasurama, Marysville, OH (US); Brian Karl Lickfelt, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 15/253,715

(22) Filed: Aug. 31, 2016

(65) Prior Publication Data
US 2018/0056936 A1    Mar. 1, 2018

(51) Int. Cl.
*B60R 25/10*  (2013.01)
*E05B 81/56*  (2014.01)
*B60W 50/00*  (2006.01)

(52) U.S. Cl.
CPC ...... *B60R 25/1001* (2013.01); *B60R 25/1003* (2013.01); *B60R 25/1012* (2013.01); *B60W 50/0098* (2013.01); *E05B 81/56* (2013.01); *B60W 2050/0077* (2013.01); *B60W 2540/28* (2013.01)

(58) Field of Classification Search
CPC ............ B60R 25/1001; B60R 25/1003; B60R 25/1012; B60R 25/10; B60R 25/24; B60W 2050/0077; B60W 2540/28; E05B 81/56; G07C 9/00; G07C 5/00; G06K 7/10; G06F 7/04; H01Q 21/30; H04W 4/02
See application file for complete search history.

(56) References Cited

U.S. PATENT DOCUMENTS 6,218,932 B1   4/2001  Stippler
6,963,268 B2   11/2005 Brillon
(Continued)

FOREIGN PATENT DOCUMENTS

WO    2014140185 A1    9/2014

OTHER PUBLICATIONS

Alrabady et al., Analysis of Attacks Against the Security of Keyless-Entry Systems for Vehicles and Suggestions for Improved Designs, 2005, IEEE, p. 41-50 (Year: 2006).*
(Continued)

*Primary Examiner* — McDieunel Marc
(74) *Attorney, Agent, or Firm* — Kenealy Vaidya LLP (57) ABSTRACT

Some embodiments are directed to a vehicle remote keyless entry system that can control functions of a vehicle can include a transceiver, a processor based controller, and a remote device. The controller is configured to predefine one or more substantially concentric radio frequency authorization zones around the controller that includes at least a first zone and a second zone, a boundary of the second zone being predefined as closer around the controller than a boundary of the first zone. The controller is configured to instruct the transceiver to transmit a polling signal, which can be received by the remote device within the one or more concentric authorization zones, with different polling intervals for each of the first zone and the second zone. The controller selectively enables one or more of the vehicle functions when the controller determines the remote device is located outside of the second zone.

20 Claims, 9 Drawing Sheets

(56) References Cited

U.S. PATENT DOCUMENTS

| | | | |
|---|---|---|---|
| 7,683,757 B2 | 3/2010 | King et al. | |
| 8,077,011 B2 | 12/2011 | McBride et al. | |
| 8,706,350 B2 | 4/2014 | Talty et al. | |
| 9,842,445 B2* | 12/2017 | Lin | B60R 25/20 |
| 2008/0143500 A1* | 6/2008 | Ghabra | B60R 25/24 |
| | | | 340/426.36 |
| 2011/0102139 A1* | 5/2011 | Girard, III | H04L 63/102 |
| | | | 340/5.61 |
| 2012/0095790 A1* | 4/2012 | Stefik | G06Q 10/02 |
| | | | 705/5 |
| 2014/0067161 A1 | 3/2014 | Conner et al. | |
| 2014/0169193 A1 | 6/2014 | Eder | |
| 2014/0285319 A1 | 9/2014 | Khan et al. | |
| 2015/0291127 A1* | 10/2015 | Ghabra | G07C 9/00309 |
| | | | 701/2 |
| 2017/0158169 A1* | 6/2017 | Luo | B60R 25/245 |
| 2018/0007507 A1* | 1/2018 | Ghabra | H04B 1/3822 |
| 2018/0012048 A1* | 1/2018 | Ricci | G06K 7/10425 |
| 2018/0012427 A1* | 1/2018 | Ricci | G07C 5/008 |
| 2018/0012433 A1* | 1/2018 | Ricci | G07C 9/00563 |
| 2018/0013211 A1* | 1/2018 | Ricci | H01Q 21/30 |

OTHER PUBLICATIONS

Aurelien Francillon, et al., "Relay Attacks on Passive Keyless Entry and Start Systems in Modern Cars", In A. Perrig, editor, NDSS 2011, ISOC, Feb. 2011.

* cited by examiner

| | Remote device Functions | Inside second zone | outside second zone |
|---|---|---|---|
| SMART/ Keyless Access | Polling | O | O |
| | Lock | O | X |
| | Unlock | O | X |
| | Power Tailgate (PTG) | O | X |
| | Power Slide Door (PSD) | O | X |
| | SMART START | O | X |
| Remote Keyless Access | Lock | O | O |
| | Unlock | O | (O) |
| | Power Tailgate (PTG) | O | (O) |
| | Power Slide Door (PSD) | O | (O) |
| | PANIC | O | O |
| | Remote Engine Start | O | O |

NOTE: O -> Applied
X -> Not Applied
(O) -> Customizable

METHODS AND APPARATUS FOR IMPEDING A VEHICLE ENTRY SYSTEM RELAY ATTACK

BACKGROUND

The disclosed subject matter relates to methods and apparatus for impeding a vehicle entry system relay attack. In particular, the disclosed subject matter relates to control systems and methods of transmitting remote keyless entry system communication signals that can impede or prevent a vehicle security breach, such as a relay attack.

Many types of vehicles, including but not limited to vehicles that travel on land, can include systems that control vehicle functions remotely from a wireless device. These functions can include, but are not limited to, activating a vehicle light, starting or stopping an engine, locking or unlocking doors, powering a tailgate or sliding door, activating or deactivating a vehicle security system, etc. Some systems are termed "remote keyless" or "smart entry" systems and can integrate with a wireless "key fob" transmitter that can be carried by a user, such as a driver or vehicle operator. These systems can provide the operator with additional convenience and safety features for his or her vehicle.

SUMMARY

In one aspect, a vehicle remote keyless entry system that can control functions of a vehicle can include a transceiver and a processor based controller, which is operatively connected to the transceiver, and a remote device configured to wirelessly communicate with the controller via the transceiver. The controller is configured to predefine one or more substantially concentric radio frequency authorization zones around the controller that includes at least a first zone and a second zone, a boundary of the second zone being predefined as closer around the controller than a boundary of the first zone. The controller is configured to instruct a transceiver to transmit a polling signal, which can be received by a remote device within the one or more substantially concentric authorization zones, with different polling intervals for each of the first zone and second zone, and instruct the transceiver to receive a verification signal from the remote device that the controller can use to authenticate an access code of the remote device and determine a location of the remote device within the first zone or the second zone. The controller selectively enables one or more of the vehicle functions when the controller determines the remote device is located outside of the second zone.

In another aspect, a vehicle can include at least one closure with a locking device configured to selectively lock and unlock the closure; a remote keyless entry system that can control functions of a vehicle. The remote keyless entry system includes a transceiver, a processor based controller, operatively connected to the transceiver, and a remote device configured to wirelessly communicate with the controller via the transceiver. The controller is configured to predefine one or more substantially concentric radio frequency authorization zones around the controller that includes at least a first zone and a second zone, a boundary of the second zone being predefined as closer around the controller than a boundary of the first zone. The controller is further configured to instruct the transceiver to transmit a polling signal, which can be received by the remote device within the one or more substantially concentric authorization zones, with different polling intervals for each of the first zone and the second zone. The controller is also configured to instruct the transceiver to receive a verification signal from the remote device that the controller can use to authenticate an access code of the remote device and determine a location of the remote device within the first zone or the second zone, and selectively enable one or more of the vehicle functions when the controller determines the remote device is located outside of the second zone.

In still another aspect, a method of operating a remote keyless entry system for a vehicle includes defining at least a first authorization zone and a second authorization zone around a controller, where the second authorization zone is defined as a substantially concentric second area around the controller, and the first authorization zone is defined as a substantially concentric first area around the second authorization zone. The method includes transmitting a first polling signal that for reception by a remote device at a first frequency into at least a portion of the first authorization zone and receiving, from the remote device, a first verification signal in response to the first polling signal if the remote device is in at least the portion of the first authorization zone. The method further includes transmitting a second polling signal for reception by the remote device at a second frequency into at least a portion of the second authorization zone, and receiving, from the remote device, a second verification signal in response to the second polling signal if the remote device is in at least the portion of the second authorization zone. The method selectively enables at least a first vehicle function when the first verification signal is validated and selectively enables at least a second vehicle function when the second verification signal is validated.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Some of the disclosed embodiments relate to vehicles configured with computer-implemented technology for passive keyless access and start systems, etc. In the disclosed embodiments, vehicles configured with in-vehicle technology and computer controllers for such systems can include automobiles, trucks, vans, minivans, sport utility vehicles (SUVs), busses, recreational vehicles, amusement park vehicles, trams, golf carts, robotically controlled vehicles, automated drive vehicles, remote controlled vehicles, drones, motorcycles, scooters, mopeds, ATVs, trains, trams, light rail trains, boats, ships, or other watercraft, aircraft, helicopters, or any transport related entity. In fact, the various disclosed methods and apparatus are intended to be usable with any type of mode of transport that can travel along, or can be located in proximity to, any improved, unimproved, and/or unmarked route or path.

A key fob can be preprogrammed to generate one or more access codes that can be transmitted over certain radio frequencies to a receiver on a vehicle. The vehicle's entry system can verify the access code from the user, and thereafter allow the user to activate or deactivate the vehicle functions. The transmission range of key fobs can vary between for example 33 ft to 3300 ft (10 m to 1000 m) depending on transmitter power, terrain, and obstacles that can cause interference with the radio signal. These instruments and controls can be implemented via processor-based electronic systems and user interfaces that can enable vehicle owners and operators to access these electronic systems. Some of these on-board computer systems operate in accordance with an operating system, software applications, user interfaces, etc. that can be installed, loaded, etc. by the manufacturer, dealer, end user, etc.

However, some remote keyless entry systems can be vulnerable to malicious hacking attacks. Experienced hackers can use one or more relay attack devices to gain a system's access codes and thereafter duplicate a wireless transponder's signals to gain access to the vehicle functions. A relay attack includes an attack on a communication of the remote keyless/SMART Entry System to make a key fob or vehicle appear close to each other; and then enabling unauthorized access to the vehicle by hacking into the access codes. A relay attack device is an electronic device that taps into an existing communication, hacks information, and transmits the hacked information to the target device (the vehicle or the key fob).

Thus, it may be beneficial to address at least one of the issues identified above. For example, it may be beneficial for a remote keyless entry system to divide an area around a vehicle into one or more access zones and enable vehicle functions only when a remote wireless device is within a zone closest to the vehicle. It may also be beneficial to transmit a polling signal to the remote wireless device at different polling intervals depending on which access zone the remote wireless device is located. It may also be beneficial to vary an output power of radio frequency signals from the remote wireless device to a control system in a manner that can impede or prevent a relay attack.

I. Exemplary Vehicle Entry System

Figure 1:
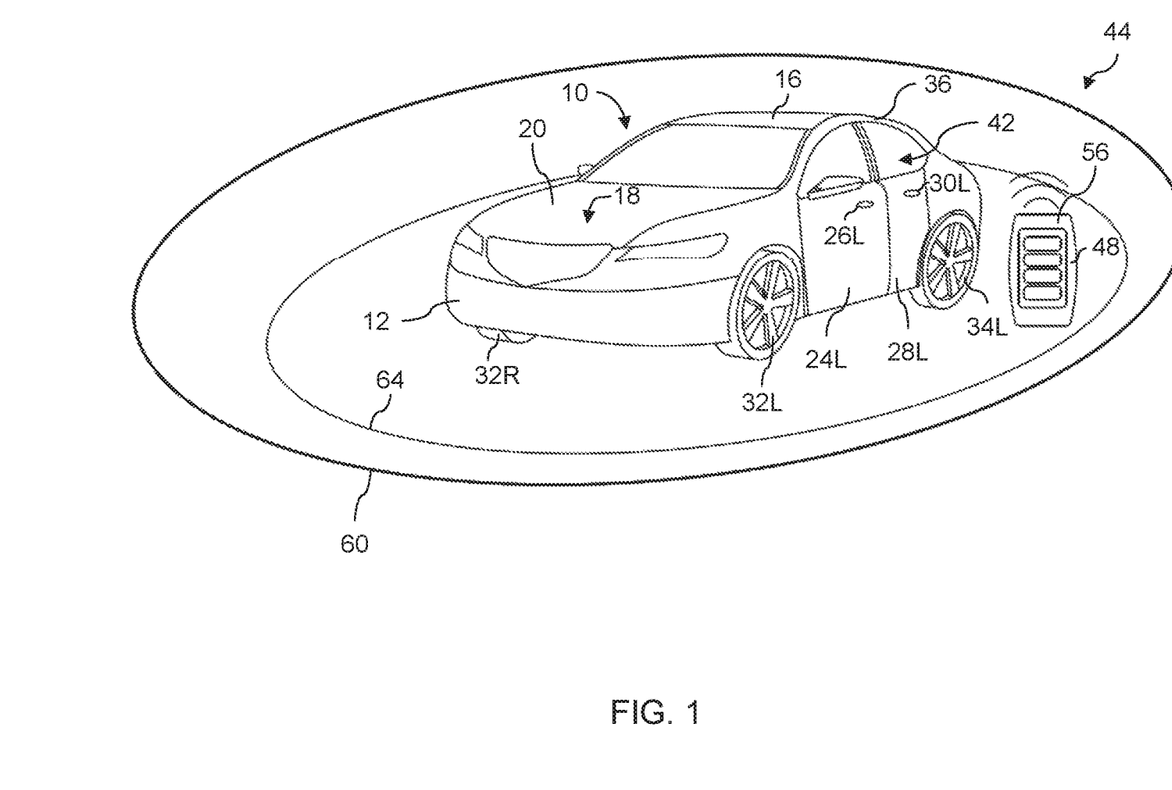
FIG. 1 is a schematic of a vehicle and remote keyless entry system access zones in accordance with the disclosed subject matter.

FIG. 1 is a schematic view of a vehicle and remote keyless entry system access zones in accordance with the disclosed subject matter. An exemplary vehicle 10 can include a front end 12, a rear end 14 (see FIG. 2), a hood 20 that can cover an engine compartment 18, and a roof 16 located between the front end 12 and the rear end 14. A body 36 of the vehicle 10 can include but is not limited to one or more of the front end 12, rear end 14, hood 20, and roof 16. The body 36 can enclose a passenger compartment 42 configured to accommodate at least one passenger. The vehicle 10 can further include passenger compartment entry points of left and right front doors 24L, 24R and left and right back doors 28L, 28R providing access to the passenger compartment 42. The pairs of doors 24L, 24R, 28L, 28R can respectively include a pair of front door handles 26L, 26R mounted to the front doors 24L, 24R and left and right rear doors handles 30L, 30R mounted to the back doors 28L, 28R that each include mechanisms for locking and unlocking the doors 24L, 24R, 28L, 28R. A powertrain for the vehicle 10 can be configured to drive a pair of left and right front wheels 32L, 32R and a pair of left and right rear wheels 34L, 34R. The vehicle 10 can also include at least one light 38 and at least one speaker 40 (see FIG. 2). The light 38 can be located interior to the vehicle 10, such as in a passenger compartment 42, or alternatively exterior to the vehicle 10. The light 38 is exemplary and can include or otherwise cover one or more lights inside or outside the vehicle 10 and can include directional lights or a dome light. The speaker 40 can be located interior to the vehicle 10, such as in the engine compartment 18, or alternatively exterior to the vehicle 10. The speaker 40 is exemplary and can include or otherwise cover one or more sound producing mechanisms inside or outside the vehicle 10. The embodiments disclosed herein are intended to include or otherwise cover methods and apparatus that could be employed in any suitable vehicle with any number and configuration of closures such as doors, hatches, trunks, hoods, gates, and functions such as lights, horns, etc.

Figure 2:
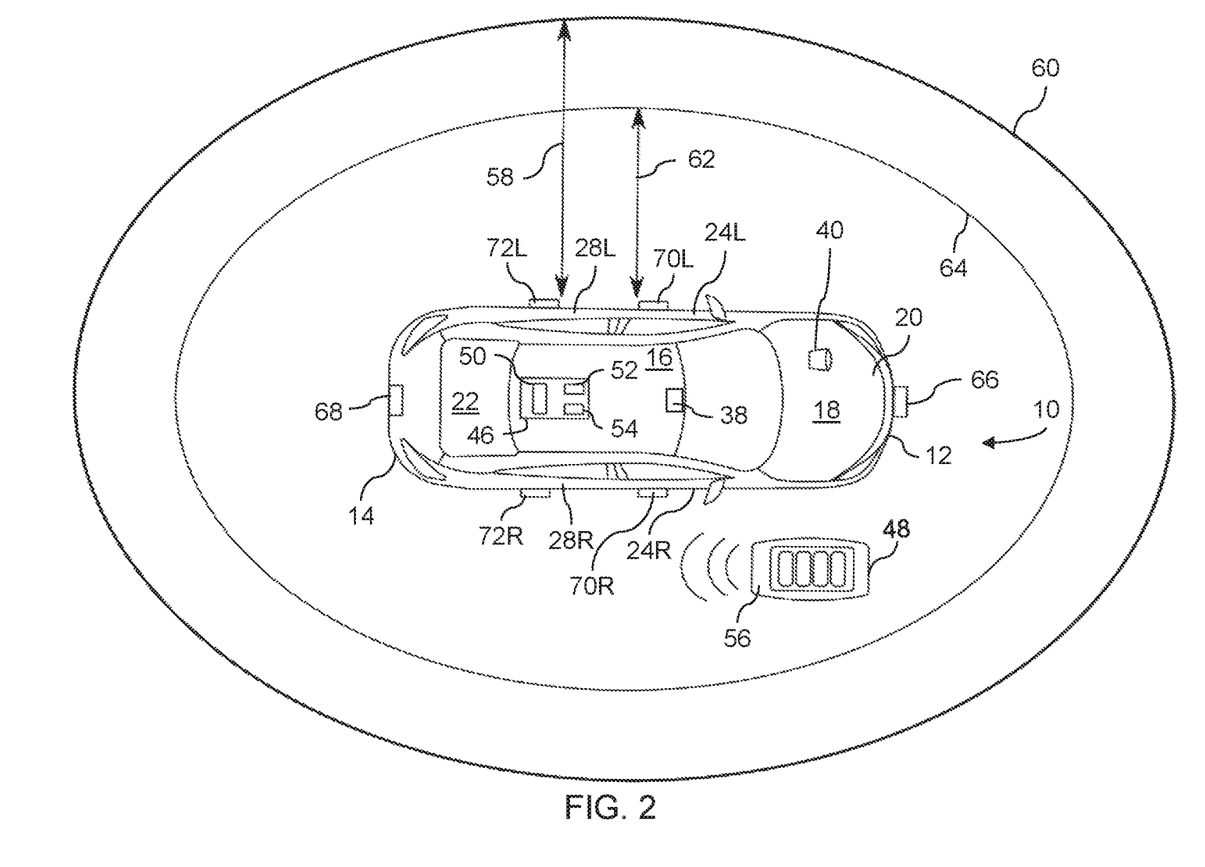
FIG. 2. is a schematic of a vehicle with a remote keyless entry control system and access zones according to the disclosed subject matter.

FIG. 2. is a schematic of a vehicle with a remote keyless entry control system and access zones according to the disclosed subject matter. The vehicle 10 includes an exemplary passive keyless access and start system, such as a remote keyless entry system 44 that can use one or more radio frequencies as a communication medium between the vehicle 10 and a transponder 56 in a wireless remote device 48. The remote keyless entry system 44 of the embodiments can include an in-vehicle control system 46, a remote device 48, and a controller 50. The control system 46 and the controller 50 can be mounted inside or outside the vehicle 10. The remote device 48 can be a hand-held electronic device with a wireless transmitter such as a key fob or personal communication device, for example a smart phone, which can be carried by a vehicle operator by hand, in a pocket, a purse, etc.

The controller 50 can use radio signals to detect a location and distance of the remote device 48. For example, the control system 46 includes a vehicle function that can cause the controller 50 to automatically activate a first passive function, such as automatically locking doors 24L,R and 28L,R when the remote device 48 travels a predetermined distance away from the vehicle 10, such as an instance when a driver carrying the remote device 48 walks away from the vehicle 10. The controller 50 can also control one or more vehicle functions such as a welcome light feature that detects the remote device 48 approaching the vehicle 10 after which the controller 50 can activate the light 38. Another vehicle function operable by the controller 50 could activate sound to play from the speaker 40 when the remote device 48 approaches the vehicle 10. The embodiments are intended to include or otherwise cover any exemplary passive or active vehicle functions that are suitable for the remote vehicle entry system 44 and vehicle 10.

The control system 46 can also include an antenna 52 and a transceiver 54 that can be mounted or attached to the vehicle 10. In the embodiments, the antenna 52 can include one or more antennas of varying configuration and can transmit and/or receiver signals of different wavelengths and/or frequencies that are compatible with the transponder 56 in the remote device 48. In the embodiments, the transceiver 54 can include one or more receivers that can receive signals of varying wavelengths and/or frequencies that are compatible with the remote device 48. In other embodiments, the control system 46 can include one or more directional transceivers that can be mounted at different locations around the vehicle 10 such as a front end transceiver 66, a rear end transceiver 68, front door handle transceivers 70L,R and back door handle transceivers 72L,R.

In operation, the controller 50 can transmit a first signal at a first frequency as a polling signal to call the remote device 48. In the embodiments, at least some of the signals transmitted over radio medium can be translated into one or more secure access codes. When the remote device 48 is within range to detect and receive the first polling signal, the remote device 48 can respond by transmitting a unique verification signal. The transceiver 54 can receive the unique verification signal and transmit the signal to a processor in the controller 50 that can determine if the received signal matches a remote device identifier (e.g., access code). If the controller 50 determines the verification signal matches the identifier, then the controller 50 can verify the identity of the remote device 48.

As illustrated in FIG. 1 and FIG. 2, the controller 50 can predefine one or more substantially concentric access zones around the vehicle 10. The controller 50 can use received signal strength indication (RSSI) technology to track a location of the remote device 48 in the one or more substantially concentric access zones. In the embodiments, the controller 50 can define a first zone 58 for a first polling signal having a predefined first zone boundary 60. In some embodiments, the first zone boundary 60 can extend up to approximately 4 m from the controller 50. However, the embodiments intend to include or otherwise cover the first zone boundary 60 extending more than 4 m, less than 4 m, or any distance from the controller 50. It can be observed that a broadcast signal instructed to be transmitted by the controller 50 can extend beyond the first zone boundary 60. In other embodiments, the second zone boundary 64 can extend up to approximately 2 m from the controller 50. However, the embodiments intend to include or otherwise cover the second zone boundary 64 extending more than 2 m, less than 2 m, or any distance from the controller 50 that is less than distance from the controller 50 to the first zone boundary 60. Although the first zone boundary 60 and the second zone boundary 64 are illustrated in FIGS. 1, 2 and 4 as concentric elliptical lines, the illustrations of the first zone boundary 60 and the second zone boundary 56 around the vehicle 10 and the distances between the vehicle 10 and the boundaries, and the distances between each first zone boundary 60 and the second zone boundary 64 are merely exemplary and not limited to the descriptions herein or illustrations of the figures.

Figure 4:
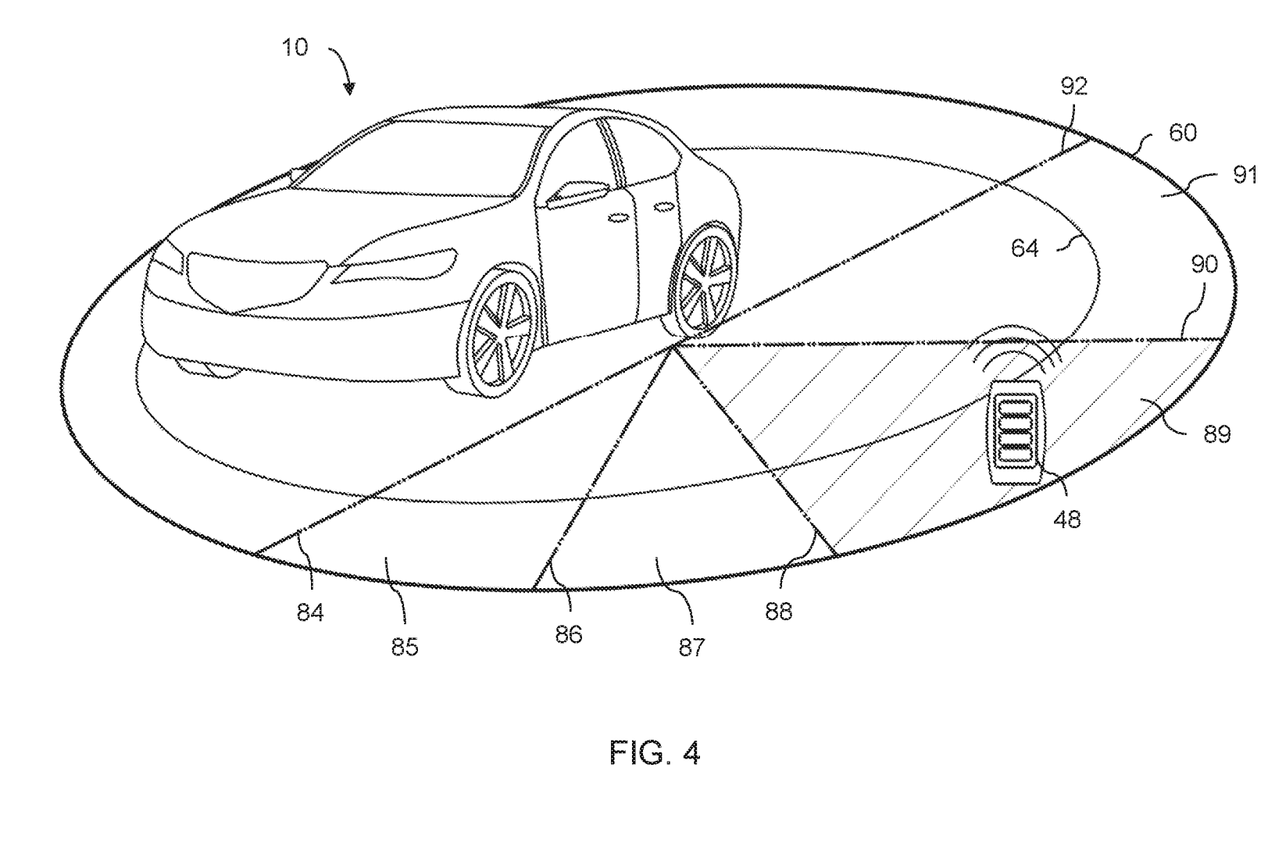
FIG. 4 is a schematic of a vehicle and remote keyless entry system access zones of FIG. 1 divided into individual sectors.

The first zone boundary 60 and the second zone boundary 64 illustrated in FIGS. 1, 2, and 4 represent areas around the vehicle 10 where RF signals of different frequency or different power are broadcast from the transceiver 52. The RF signals can propagate into at least a portion of the area around the control system 46 such that the signals can be received, measured, and/or differentiated by the remote device 48. The first zone boundary 60 and the second zone boundary 64 are not limited by any particular shape, and may be substantially elliptical, substantially circular, irregular, or any shape that could be defined using RF signal power and attenuation properties. Alternatively, the first zone boundary 60 and the second zone boundary 64 may not be exactly concentric, but can be at least substantially concentric.

In the embodiments, the controller 50 can communicate with the remote device 48 when the remote device 48 receives the first polling signal broadcast within at least a portion of the first zone 58 over one or more RF frequencies. Examples of frequencies over which the controller 50 can communicate can include 313 MHz, 433 MHz, and 925 MHz. However, the embodiments are intended to include or otherwise cover frequencies lower than 313 MHz, higher than 313 MHz, or any other suitable frequencies for wireless communication between the controller 50 and the remote device 48. When the remote device 48 is within the first zone 58, the remote device 48 can receive the first polling signal from the controller 50, and in response the remote device 48 can transmit the first verification signal that can be received by the transceiver 54.

In the embodiments, the controller 50 can define a second zone 62 completely around the vehicle 10 in which a second polling signal can be broadcast by the controller 50 into at least a portion of the second zone 62. In the embodiments, the controller 50 can communicate with the remote device 48 within the second zone 62 over one or more RF frequencies that can be different than the one or more frequencies used by the controller 50 and the remote device 48 in the first zone 58. In one embodiment, the second polling signal and the second verification signal are low frequency (LF) signals that can be transmitted at or near 125 kHz. However, the embodiments can include or otherwise cover frequencies higher than 125 kHz, lower than 125 kHz, or any other suitable frequencies for wireless communication between the controller 50 and the remote device 48. When the remote device 48 is within the first zone 58, the transponder 56 can receive the first polling signal from the antenna 52, and in response the transponder 56 can transmit the first verification signal that can be received by the transceiver 54.

In the embodiments, RSSI technology may be used by the controller 50 to measure strength of the RF signals broadcast from the remote device 48. The controller 50 can use the RSSI data to calculate a distance of the remote device 48 from the controller 50. The RSSI from the remote device 48 within the second zone is more than the RSSI in the first zone. The controller 50 can analyze RSSI measurements to track movement of the remote device 48 and determine movement patterns towards or away from the vehicle 10 and thereby determine if a user is located within an access zone, entering into an access zone, or exiting out of an access zone. When the remote device 48 receives LF radio signals broadcast within a least a portion of the second zone 62, the remote device 48 can be tracked by the controller 50 periodically, for example every second, every millisecond, etc. In an embodiment, the controller 50 can initiate transmission of the second polling signal through the antenna 52 after the controller 50 determines that the remote device 48 has entered the first zone 58. When the remote device 48 is within range and the transponder 56 receives the second polling signal, the remote device 48 can respond by transmitting a second verification signal that can be received by the transceiver 54. The controller 50 can compare the second verification signal to a unique access code and, if the controller 50 determines a match, verify the identity of the remote device 48. The verification steps also validates that a vehicle operator is approaching near the vehicle 10.

In the embodiments, the second zone boundary 64, which is defined by the use of LF radio signals, can extend a predetermined approximate radial distance from the controller 50. In one example, the second zone boundary 64 can extend two meters around the controller 50. In some embodiments, the first zone 58 can entirely overlap the second zone 62 and extend further away from the vehicle 10 than the second zone 62. Thus, as a vehicle operator approaches the vehicle 10 carrying the remote device 48, the remote device 48 can receive and respond to the first polling signal from the controller 50 before the remote device 48 can receive and respond to the second polling signal from the controller 50. In the embodiments, the first zone boundary 60 can be defined by relating the RSSI of first verification signal from the remote device 48 to a distance. Thus, the remote device 48 crosses the first zone boundary 60 into the first zone 58 when the strength of the signal from the transponder 56 responding to the first polling signal reaches a threshold value. Similarly, when the remote device 48 crosses the second zone boundary 64 and enters the second zone 62 when the strength of the signal from the transponder 56 responding to the second polling signal reaches a threshold value. However, the embodiments are not limited to RSSI measurements to determine at least substantially concentric authorization zone boundaries and a location of the remote device 48. In other embodiments, other methods and apparatus to determine a location of the remote device 48 could be used such as, but not limited to, determining a global positioning system (GPS) location of the remote device 48 and transmitting the location data to the controller 50.

Figure 3:
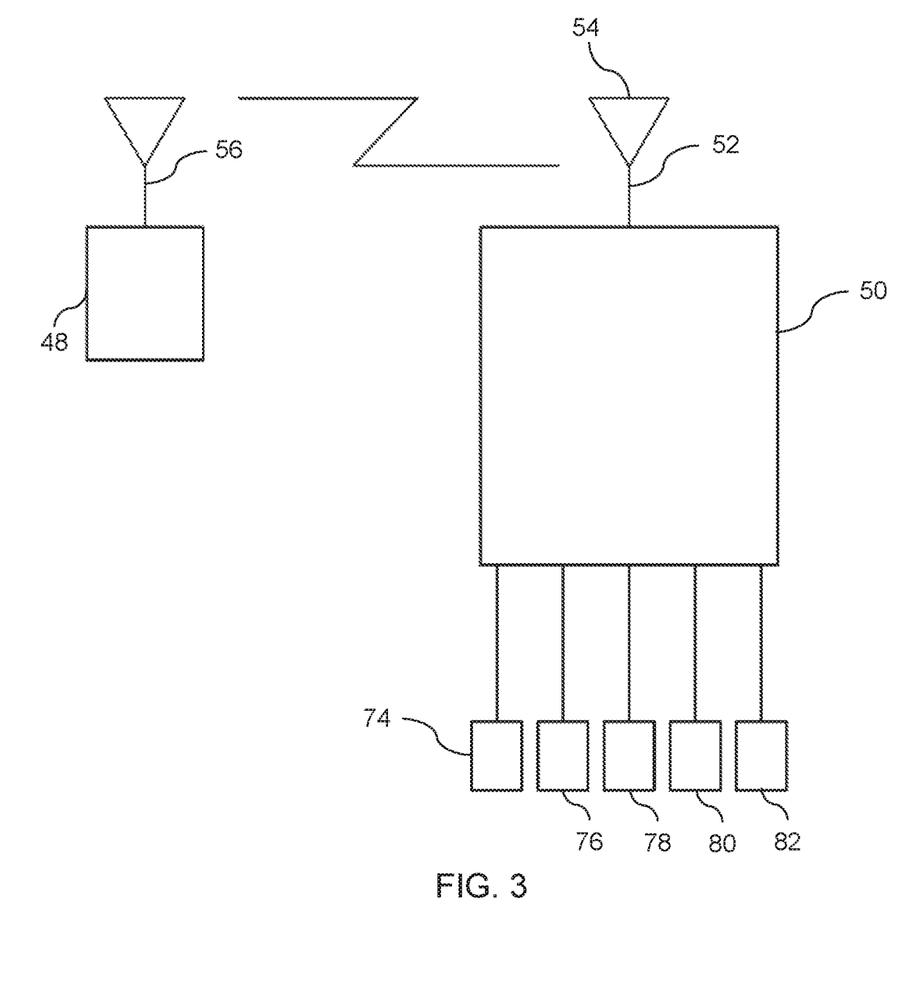
FIG. 3 is a schematic of an exemplary controller for a remote keyless entry system according to the disclosed subject matter.

FIG. 3 is a schematic of an exemplary controller for a remote keyless entry system according to the disclosed subject matter. The vehicle 10 may have the controller 50 operationally and physically connected to the vehicle 10. The controller 50 can include a processor and memory having programmed logic in the form of instructions or other software code. A processor may be any known, related art or later developed processor. Alternatively, the processor may be a dedicated device, such as an ASIC (application-specific integrated circuit), DSP (digital signal processor), etc. In some embodiments, the controller 50 can include other components present in general or special purpose computers including programmable logic circuits and/or pre-configured logic circuits for executing vehicle functions. A memory can store information accessible by a processor including an operating platform, special applications, and data that may include instructions for execution or otherwise used by a processor. A memory may be of any type capable of storing information as non-transient signals or otherwise that can be accessible by the processor, including a computer-readable medium, or other medium that stores data that may be read with the aid of an electronic device, such as a hard-drive, flash drive, memory card, ROM, RAM, DVD or other optical disks, as well as other write-capable and read-only memories. Data may be retrieved, stored or modified by a processor. For instance, although data for the controller 50 is not limited by any particular data structure, the data may be stored in computer registers, in a relational database as a table having a plurality of different fields and records, XML documents, flat files, etc. The data may also be formatted in any computer-readable format. The data may include any information sufficient to identify the relevant information, such as numbers, descriptive text, proprietary codes (e.g., predetermined access codes or randomly generated access codes), references to data stored in other areas of the same memory or different memories (including other network locations) or information that is used by a function to calculate the relevant data. Embodiments may include different combinations of the foregoing, whereby different portions of instructions and data are stored on different types of media. In some embodiments, the vehicle 10 may include one or more in-vehicle controller systems 46 that can include one or more controllers 50.

A processor for the controller 50 can include preprogrammed logic (for example, software instructions or computer program code), when executed by a processor causes the processor to perform the functions of the embodiments as described herein. For example, a processor can included preprogrammed logic that determines when RSSI of the first polling signal or the second polling signal from the remote device 48 is strong enough to reach a threshold signal strength indication. In some embodiments, the controller 50 can analyze the threshold signal strength of the first polling signal from the remote device 48 and compare with a predetermined threshold. If the signal strength of the first polling signal from the remote device 48 meets the threshold, then the controller 50 can determine that the remote device has crossed the first zone boundary 60 and entered the first zone 58. In the embodiments, the controller 50 can analyze the signal strength of the second polling signal from the remote device 48 and compare with a predetermined threshold. If the signal strength of the second polling signal from the remote device 48 meets the threshold, then the controller 50 can determine that the remote device has crossed the second zone boundary 64 and entered the second zone 62. In other words, the controller 50 can detect whether the remote device 48 is located within the first zone 58 or the second zone 62.

The controller 50 may include a communication system connected to communication input/output devices that can communicate with the antenna 52 and the transceiver 54, which can be different features or functions of the same device or two or more separate devices. The controller 50 and other control devices may be provided as a unitary system or may otherwise be separate systems and devices from, but operationally connected to, the control system 46. The controller 50 may be capable of communicating with and/or controlling various components and/or functions of the vehicle 10. For example, controller 50 may be in operational communication with a vehicle electronic control unit (ECU), which can controls core vehicle processes and systems relevant to operation of the vehicle 10. The ECU can receive data from vehicle systems including a vehicle sensor system and a vehicle subsystem.

In FIG. 3, the antenna 52 and the transceiver 54 of the control system 46 are illustrated as separate devices operationally connected to the controller 50. The controller 50 can electronically communicate with one control modules for electro-mechanical devices of the vehicle 10 through separate or the same channels. The controller 50 can execute instructions that can operate one or more vehicle functions using control modules that can include, but are limited to, remote engine start control module 74, interior light control module 76, door locks control module 78, power tailgate control module 80, and power slide door control module 82. The embodiments are intended to include or otherwise cover any suitable control module that can control an electro-mechanical device in the vehicle 10.

FIG. 4 is a schematic of remote keyless entry system zones of FIG. 1 divided into individual sectors. In an embodiment, the controller 50 can generate a plurality of sub-zones by subdividing the first zone 58 and second zone 62 into directional, logical, geographic, etc., predetermined sectors defined by one or more of RF, logical, or locational boundaries. In an embodiment in FIG. 4, portions of the first zone 58 and second zone 62 to left side of the vehicle 10 have been subdivided into a first sector 85 defined by predetermine boundaries 84 and 86, a second sector 87 defined by predetermined boundaries 86 and 88, a third sector 89 defined by predetermined boundaries 88 and 90, and a fourth sector 91 defined by predetermined boundaries 90 and 92. The sectors 85, 87, 89, 91 can be defined by the controller 50 including additional transponders on the vehicle 10, including but not limited to, a front transponder 66, a rear transponder 68, front door handle transponders 70L,R, and back door handle transponders 72L,R, that can communicate with the controller 50 and the remote device 48. The controller 50 can selectively classify or apportion out vehicle functions according to the different sectors surrounding the vehicle 10. In the embodiment, when the remote device 48 moves into one of the sectors (e.g., sector 89 in FIG. 4) only the vehicle functions corresponding to that sector are selectively activated by the controller 50. If the remote device 48 approaches the vehicle 10 across sector 89, transponders 70L, 72L can communicate with the remote device transponder 56 and using the methods described herein, the controller 50 can determine that the vehicle operator is approaching the vehicle 10 from a certain direction. For example, controller 50 can activate exterior and/or interior lights 38 on a left side of the vehicle 10 when the vehicle operator carrying the remote device 48 enters the first zone 58 from sector 89 and can activate a door unlock function to the front left door 24L when the driver enters the second zone 62 from sector 89. The embodiments are intended to include or otherwise cover suitable vehicle functions that can be selectively activated by the controller 50 depending on the location of the remote device 48.

II. Vehicle Entry System Operation

Figure 5:
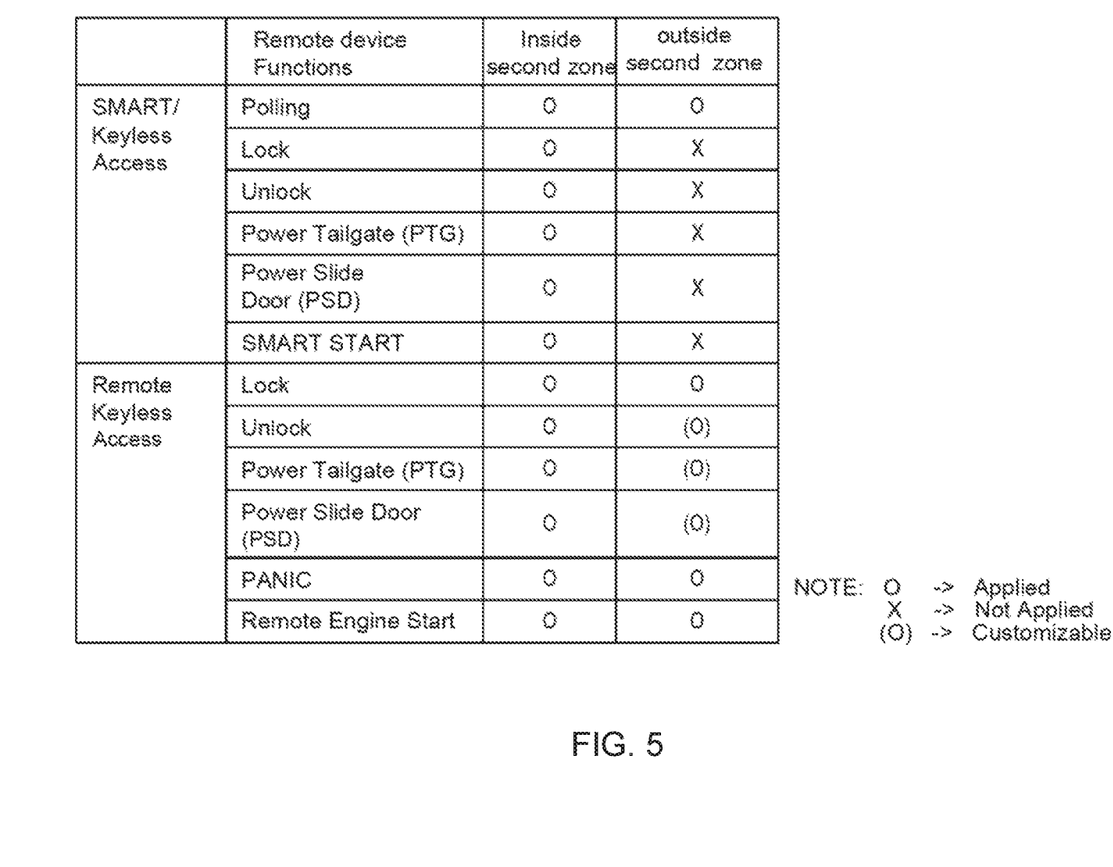
FIG. 5 is a table of exemplary vehicle functions that can be selectively activated by the remote keyless entry system in accordance with the disclosed subject matter.

FIG. 5 illustrates a table of exemplary functions that can be selectively activated by the remote keyless entry system in accordance with the disclosed subject matter. In the table, vehicle keyless access functions (such as functions connected to control modules 74, 76, 78, 80, 82) are divided into an exemplary Smart/Keyless Access system category and a prior Remote Keyless Access system category. The table discloses that the Remote Keyless Access system category functions are enabled or customizably enabled when the remote device 48 is located outside of the second zone 62. However, the table discloses that in the exemplary embodiments, the SMART/Keyless Access system functions are all disabled by the controller 50 when the remote device 48 is outside of the second zone 62, except for the polling signal (e.g., the second polling signal). The table also discloses that all vehicle functions are enabled for the exemplary SMART/Keyless Access system category functions and for the prior Remote Keyless Access system vehicle functions inside second zone 62. For example, the table can be interpreted such that when the remote device 48 is located in the first zone 58 and not within the second zone 62, none of the SMART/Keyless access vehicle functions such as lock, unlock, power tailgate, power slide door, SMART start are enabled by the controller 50. However, when the remote device 48 enters the second zone 62 nearer to the vehicle 10, the same or similar vehicle functions are enabled by the controller 50. When the remote device 48 is outside of the second zone 62 (i.e., within the first zone 58) the controller 50 continues to operate a polling function that transmits a polling signal. In an alternative embodiment, the controller 50 can activate other vehicle functions that do not contribute to a potential security breach of the vehicle 10 if maliciously intercepted. For example, outside of the second zone 62, the controller 50 can activate only the polling function and, upon communication with the remote device 48 as described above, activate the interior light 38 and/or the speaker 40. In alternative embodiments, a user can configure the controller 50 to selectively activate the functions when the remote device 48 is outside of the second zone 62. Selectively enabling such functions within the first zone 58, however, can be detrimental towards vehicle security.

In some embodiments, the controller 50 can detect an impending relay attack on the vehicle 10 using various methods that can include, but are not limited to, transmitting a random polling signal interval, varying the RF signal strength (i.e., transmitted power) of RF signals from the controller 50 and/or the remote device 48, or verifying the time of flight of signals between the controller 50 and the remote device 48. Any variation in these signals other than the intended reception can indicate an impending relay attack.

An LF broadcast zone around a vehicle, such as the second zone 62, is where most malicious relay attacks against a vehicle can occur. In the embodiments, to protect the vehicle 10 against malicious relay attacks, the controller 50 can be preprogrammed to vary signal broadcast intervals to the remote device transponder 56. For example, when the remote device 48 is within the first zone 58, the transponder 56 can receive the first polling signal from the controller 50. The remote device 48 can respond to the first polling signal and transmit the first verification signal that can be received by the transceiver 54. Similarly, the controller 50 can transmit the second polling signal that can be received by the transponder 56, when in range, and the transponder 56 can respond to the second polling signal and transmit the second verification signal that can be received by the transceiver 54. To enhance security, the controller 50 can transmit the first polling signal and the second polling signal at different polling intervals. In one embodiment, as the remote device 48 enters the first zone 58 the controller 50 can increase the first polling signal interval at an increasing rate related to a distance the remote device 48 is from the vehicle 10 (i.e., a user moving towards the vehicle 10 carrying the remote device 48). The remote device 48 can respond to each first polling signal with a first verification acknowledging the increased polling signal intervals. Likewise, when the remote device 48 enters the second zone 58, the controller 50 can increase the second polling signal interval at an increasing rate related to a distance the remote device 48 is from the vehicle 10. The remote device 48 can respond to each second polling signal with a second verification signal acknowledging the increasing second polling signal rate. The controller 50 can transmit the second polling signal at a maximum rate when the remote device 48 is nearest to the vehicle 10. In another embodiment, the controller 50 can transmit the first and second polling signals in a random time pattern, instead of periodically, as the remote device 48 traverses the first zone 58 and second zone 62. The remote device 48 can respond to the randomly timed polling signals with first or second verification signals, depending on whether the remote device 48 is located in the first zone 58 or the second zone 62. After reception by the transceiver 54, the controller 50 can analyze that the verification signals were transmitted by the remote device 48 in the correct random order and thereby verify the identity of the remote device 48. Thus, the embodiments are advantageous in making it difficult for a relay attack device to copy the changes in the polling signal and provide a higher likelihood of exposure for relay attack detection.

In another embodiment, the controller 50 can enhance security of the entry system 44 by controlling RF output power (dBm) of the remote device 48 as the remote device 48 traverses the first zone 58 and/or the second zone 62. In an exemplary embodiment, as a vehicle operator carries the remote device 48 and approaches the vehicle 10, the remote device 48 will respond to the first polling signal from the controller 50 when inside the first zone 58 and to the second polling signal from inside the second zone 62. Before or after transmitting the first verification signal or second verification signal, the remote device 48 can vary output RF power in a sequential method that may appear random to a potential relay attack device. However, the remote device 48 can follow a predetermined RF power output variance that is known only to the controller 50 such that the controller 50 can anticipate the resulting RSSI from the remote device 48. A program in the controller 50 can compare the detected RSSI from the remote device 48, received by the transceiver 54, with a predetermined RSSI pattern, and if the controller 50 can match the predetermined RSSI pattern with the received RSSI within a predetermined margin of error, the controller 50 can verify the identity of the remote device 48. The exemplary process for varying the output power of the remote device 48 can make it difficult for a relay attack device to copy the changes in the RF output power and therefore provide enhanced protection to the vehicle 10 from an impending relay attack.

In other embodiments, the exemplary use of sectors, as illustrated in FIG. 4, can enhance the security of the vehicle 10 and assist in protection from an impending relay attack. In the embodiments, when the remote device 48 traverses the first zone 58 or the second zone 62, one of the plurality of transceivers 66, 68, 70, 72 can detect a signal from the remote device's direction, thereby providing a directional location of the remote device 48. A relay attack device may not typically be within the line-of-sight between an approaching vehicle operator 10 and the vehicle 10. As described previously, the controller 50 can divide the first zone 58 and the second zone 62 into sectors 85, 87, 89, 91. Upon detection by the controller 50 of an approach of the remote device 48, only the sector or sectors covering the direction of approach can be enabled with vehicle functions. The vehicle functions for all other sectors are disabled, including transmission of polling signals. In one embodiment, an omnidirectional polling signal from the control system 46 can be disabled by the controller 50 and only a directional polling signal enabled by the controller 50.

For example, when the remote device 48 is within the sector 89 of the first zone 58, the transponder 56 can receive the first polling signal from the controller 50 when in range, and the transponder 56 can respond to the first polling signal and transmit the first verification signal that can be received by the transceiver 54. In response, the controller 50 will deactivate an omnidirectional broadcast from the antenna 52 and can only communicate with the remote device 48 via the front door handle transceiver 70L. Similarly, the controller 50 can transmit the second polling signal that can be received by the transponder 56, when in range. For example, the remote device 48 can respond to the second polling signal and transmit the second verification signal that is received by the front door handle transceiver 70L thus providing further protection against a malicious relay attack.

In the embodiments, the controller 50 can also include a communications interface that enables the controller 50 to access other computers and resources on a communication network. A communications interface can be used to allow software and data to be transferred between the controller 50 and external devices. Examples of communications interface 818 can include a modem, a network interface (such as an Ethernet or other NIC card), a communications port (such as for example, a USB port), a PCMCIA slot and card, etc. Software and data transferred via a communications interface are in the form of signals which can be electronic, electromagnetic, optical, or other signals capable of being received by a communications interface. These signals are provided to a communications interface via a channel. This channel may carry signals and may be implemented using a wireless medium, wire or cable, fiber optics, or other communications medium. Some examples of a channel include a phone line, a cellular phone link, an RF link, a network interface, a local or wide area network, and other communications channels. What is important is that the various computers and peripherals can interact to perform various document services.

The controller 50 further includes input/output devices such as a keyboard and a mouse that enables a user to enter data and instructions into the computer system, a display device that enables the user to view the available information, and a printer that enables the user to print any data for his reference. Alternatively, input/output devices 822 may include a touch sensitive display that enables a user to enter data and instructions into the controller 50 as well as to view the available information In this document, the terms "computer program product" and "computer-readable medium" may be used generally to refer to media such as, for example, a memory, storage devices, storage unit 816 or signal(s) on a channel. These and other forms of computer-readable media may be involved in providing one or more sequences of one or more instructions to a processor for execution. Such instructions, generally referred to as "computer program code" (which may be grouped in the form of computer programs or other groupings), when executed, enable computer system to perform features or functions of embodiments of the present invention.

In an embodiment where the elements are implemented using software, the software may be stored in a computer-readable medium and loaded into computer system 800 using, for example, removable storage unit 816, media drive 810 or communications interface 818. The control logic (in this example, software instructions or computer program code), when executed by processor 804, causes processor 804 to perform the functions of the invention as described herein.

III. Examples of Relay Attacks

Figure 6:
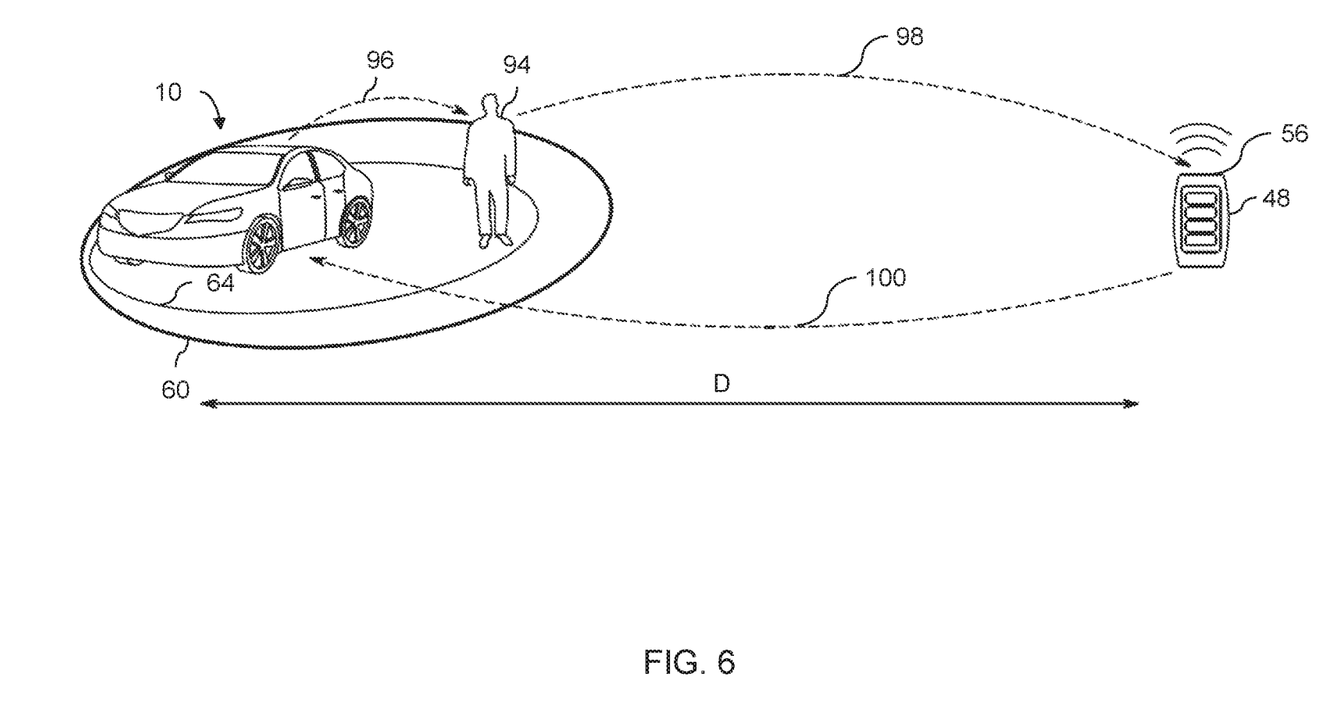
FIG. 6 is a schematic of a relay attack on a low frequency transmission with a relay device near a vehicle.

FIG. 6 is a schematic of a relay attack on a low frequency transmission with a relay device near a vehicle. A relay attack can be categorized as a Low Frequency (LF) attack when a relay attack device is near the vehicle 10 and the attack is carried out on an LF signal 96 from the vehicle 10 to the remote device 48. The distance D covered can be approximately 30 m in the example. A first attacker 94 within the second zone boundary 64 can intercept the LF signal 96 from the vehicle 10 with a relay attack device that can include a receiver/transmitter that can amplify a signal within the range of signals from controller 50 and transmit the signal to the remote device 48. The attacker 94 amplifies the LF signal 96 from the vehicle 10 and re-transmits as LF signal 98, which is then received at the remote device 48. The remote device 48 responds with an RF signal 100 back to the vehicle. In this relay attack scenario, the controller 50 believes that the remote device 48 is within the second zone boundary 64 and will change the status of all vehicle functions to enabled.

Figure 7:
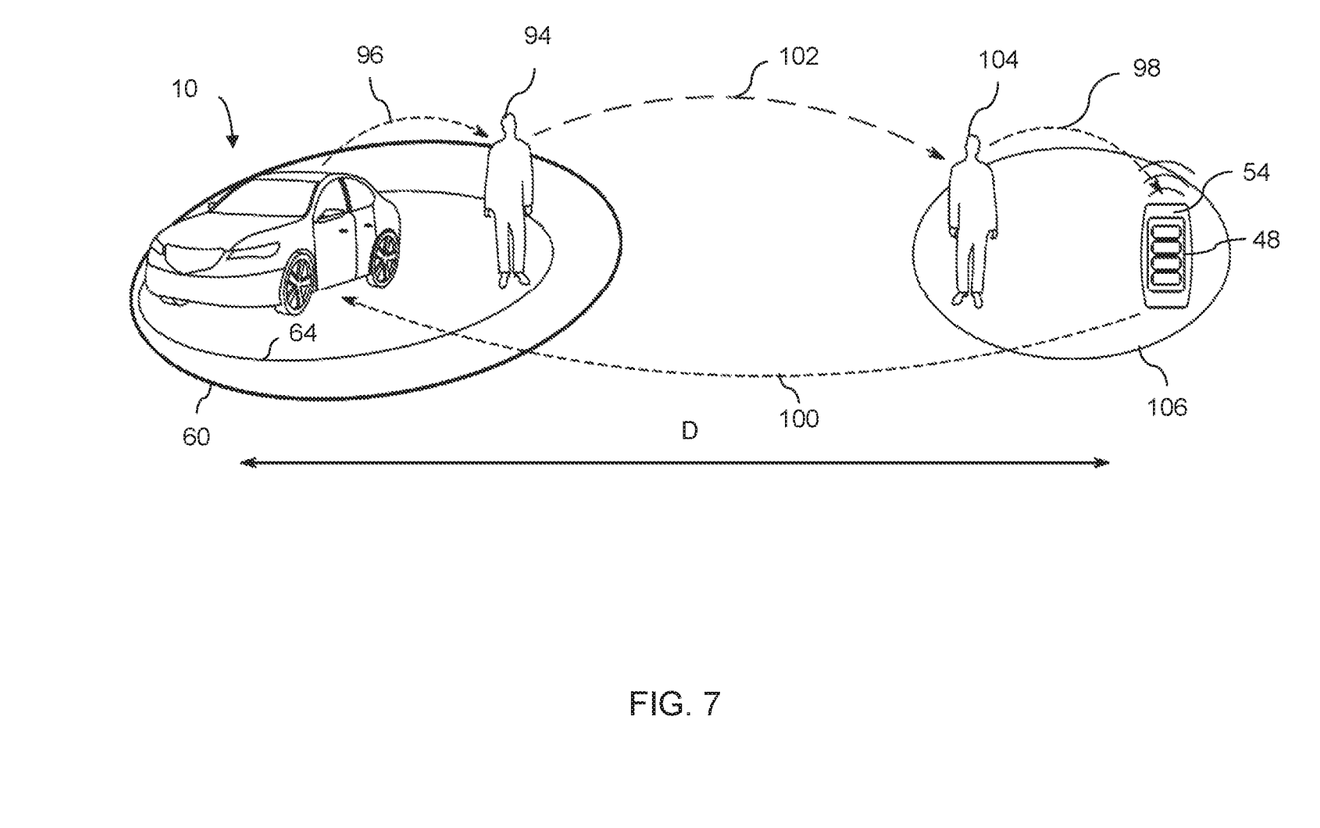
FIG. 7 is a schematic of a relay attack on a low frequency transmission with a relay device near a vehicle and a relay device near a remote wireless key device.

FIG. 7 is a schematic of a relay attack on a low frequency transmission with a relay device near a vehicle and a relay device near a remote wireless key device. If the distance D between the remote device 48 and the vehicle 10 is above a certain threshold, then a variation of the LF attack of FIG. 6 is employed that involves placing the first attacker 94 near the vehicle 10 and a second attacker 104 near the remote device 48. The distance D between the vehicle 10 and the remote device 48 could be up to approximately 1000 m. The LF signal 96 is intercepted by the first attacker 94 within the second zone boundary 64 where the signal is amplified and transmitted as a modulated LF signal on an RF carrier 102 to the second attacker 104, which receives the modulated LF signal 102 and retransmits as LF signal 98 to the remote device 48. To the controller 50, this attack makes the vehicle 10 appear closer to the remote device 48 than the actual distance D. The remote device 48 transmits the RF signal, or first verification signal, to the controller 50 since the vehicle 10 is within RF range of the remote device 48.

Figure 8:
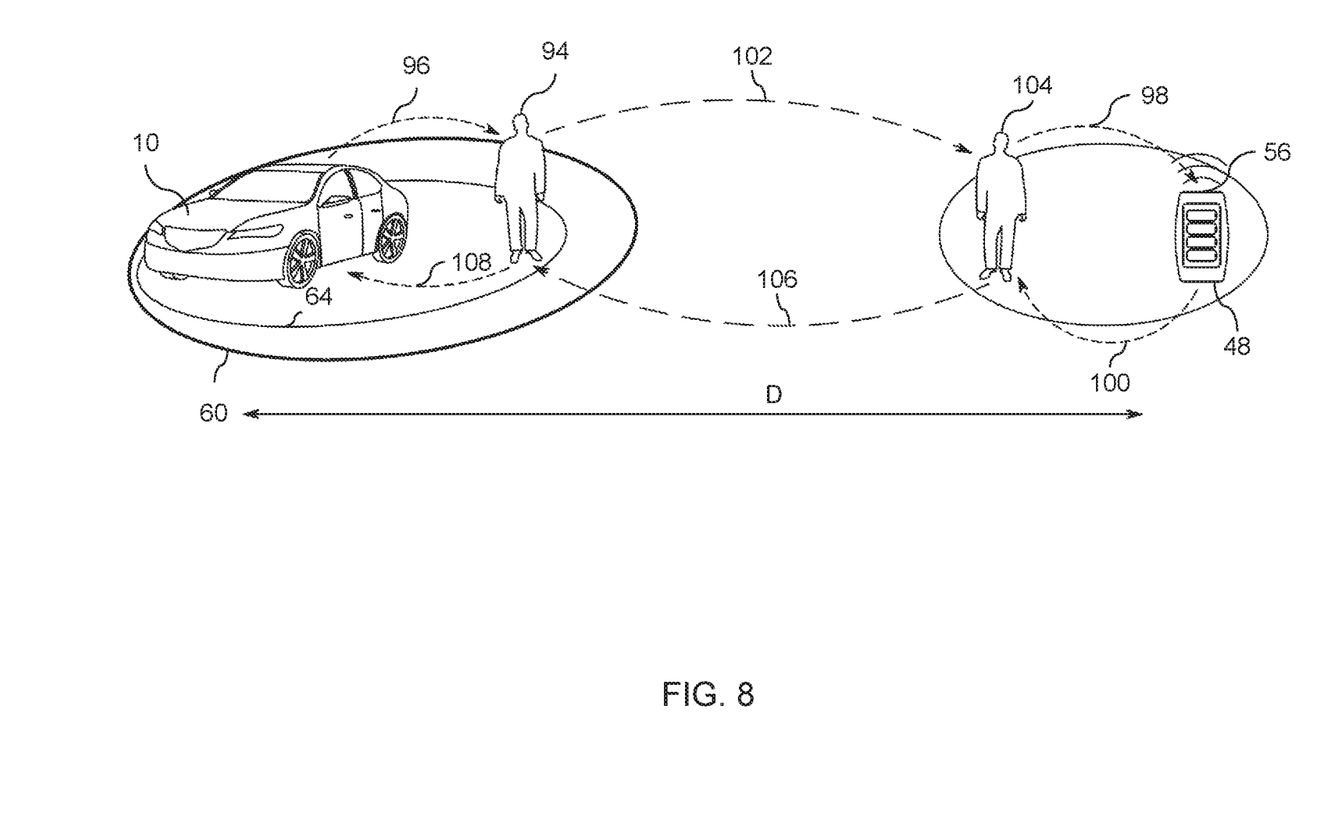
FIG. 8 is a schematic of an alternative relay attack on a low frequency transmission with a relay device near a vehicle and a relay device near a remote wireless key device.

FIG. 8 is a schematic of an alternative relay attack on a low frequency transmission with a relay device near a vehicle and a relay device near a remote wireless key device. The relay attack can be categorized as a Radio Frequency (RF) attack when the relay attack device is near the remote device 48 and the attack is carried out on an RF communication from the remote device 48 to the vehicle 10. The first attacker 94 is located within the second zone boundary 64 and the second attacker 104 is located near the remote device 48. The distance D can be greater than 1000 m by means of modulating signals over a cellular network, the Internet, etc. The LF signal 96 is intercepted by the first attacker 94, amplified, and transmitted as a modulated LF signal 102 on an RF carrier to the second attacker 104, which receives and transmits the LF signal 98 to the remote device 48. The remote device 48 will transmit the second verification signal 100, which is intercepted by the second attacker 104 and transmitted as a modulated RF signal on an RF carrier 106 back to the first attacker 94. The first attacker 94 then transmits the RF signal within the second zone boundary 64 to the vehicle 10. The logic within remote device 48 and the controller 50 will determine that the remote device 48 is within the second zone boundary 64, when the distances are actually too far for direct communication.

Figure 9:
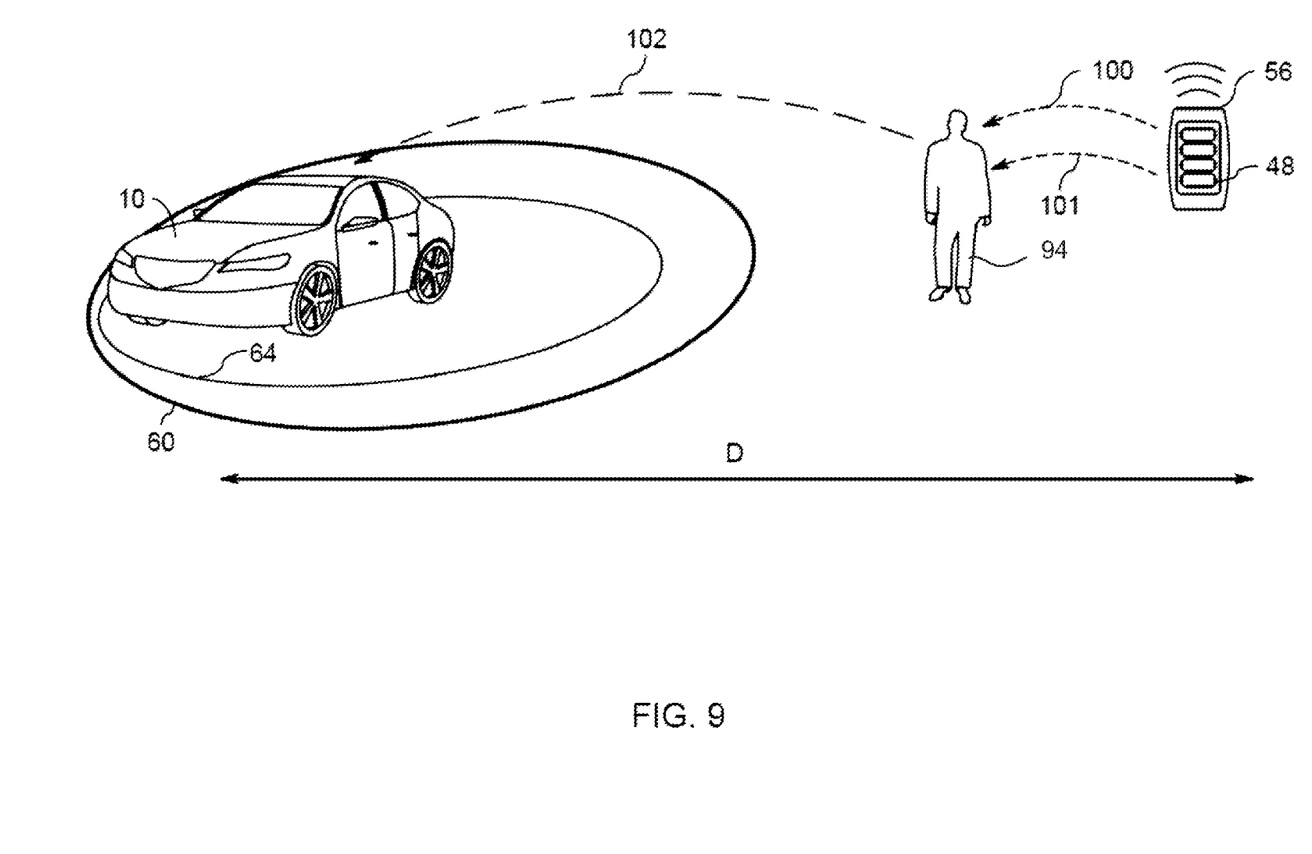
FIG. 9 is a schematic of a relay attack on a standard frequency transmission with a relay device near a remote wireless key device.

FIG. 9 is a schematic of a relay attack on a standard frequency transmission with a relay device near a remote wireless key device. In this scenario, the first attacker 94 with a relay attack device is located near to the remote device 48 and an attack is made on an RF communication from the vehicle 10 and the remote device 48. The RF signals (i.e., verification signals) of a first access code 100 and repeated RF signal of a second access code 101 from the remote device 48 sent by a vehicle operator repeatedly trying locate or unlock the vehicle 10 are repeatedly intercepted by the attacker 94 and the transmissions to the controller 50 on the vehicle 10 jammed. The attacker 94 hacks the access codes from the intercepted signals and at a later time retransmits the hacked access codes and gains access to the vehicle 10.

IV. Alternative Embodiments

While certain embodiments of the invention are described above, and FIGS. 1-9 disclose the best mode for practicing the various inventive aspects, it should be understood that the invention can be embodied and configured in many different ways without departing from the spirit and scope of the invention.

Exemplary embodiments are intended to include or otherwise cover additional criteria to configure and use one or more vehicle access zones shown in FIGS. 1, 2 and 4. Additional criteria may include tracking a wireless remote device's movement as a user carries it through different RF coverage areas around the vehicle 10 and tracking the strength and type of RF signals received by a control system. The controller 50 can use alternative methods and technology to estimate a location of the remote device 48 around the vehicle 10 including but not limited to triangulation of RF signals or a remote device's GPS location transmitted to the control system 46.

Exemplary embodiments are intended to include or otherwise cover any type of vehicle function, control, data transmission, wireless communication with a carrier network, or software application for use by a vehicle's remote keyless entry system.

Some of the exemplary embodiments are disclosed in the context of in-vehicle vehicle computer systems for a vehicle's remote keyless entry systems. However, any and all of the disclosed features can also be applied to other types of in-vehicle control systems, such as remotely operated vehicles or automated vehicles. In fact, some embodiments can be applied in contexts that do not involve vehicles.

Exemplary embodiments are intended to include or otherwise cover any type of a software-driven controller 50 for the vehicle 10 according to the embodiments that can be configured outside of the vehicle 10 and that can communicate instructions and commands for execution of control system 46 operations.

Exemplary embodiments are intended to cover execution of method steps on any appropriate specialized or general purpose server, computer device, or processor in any order relative to one another. Some of the steps in the embodiments can be omitted, as desired, and executed in any order.

Computer architecture of the embodiments may be a general purpose computer and/or processor or a special purpose computer and/or processor. A computer and/or processor can be used to implement any components of the control system 46 or the computer-implemented methods of the embodiments. For example, components of control system 46 can be implemented on a computer via its hardware, software program, firmware, or a combination thereof. Although individual computers or servers are shown in the embodiments, the computer functions relating to control system 46 may be implemented in a distributed fashion on a number of similar platforms, to distribute the processing and/or functional load.

Embodiments are also intended to include or otherwise cover methods of using and methods of manufacturing the control system 46 disclosed above. The methods of manufacturing include or otherwise cover processors and computer programs implemented by processors used to design various elements of the control system 46 above. For example, embodiments are intended to cover processors and computer programs used to design or test the control system 46.

Exemplary embodiments are intended to cover all software or computer programs capable of enabling processors to execute instructions and implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Embodiments are amenable to a variety of modifications and/or enhancements. For example, although the implementation of various components described above may be embodied in a hardware device, it can also be implemented as a software-only solution, e.g., an installation on an existing server. In addition, systems and their components as disclosed herein can be implemented as a firmware, firmware/software combination, firmware/hardware combination, or a hardware/firmware/software combination.

Some of the disclosed embodiments include or otherwise involve data transfer over a network, such as downloading update files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), Wi-Fi networks, a Dedicated Short Range Communications (DSRC), network, short-wave radio, television, cable, satellite communications, and/or any other delivery or tunneling mechanism for carrying data. A network may include multiple networks or sub-networks, each of which may include, for example, a wired or wireless data pathway. The network may include a circuit-switched network, a packet-switched network, or any other network able to carry electronic communications. For example, the network may include networks based on the Internet protocol (IP) or asynchronous transfer mode (ATM). Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention.

What is claimed is:

1. A vehicle remote keyless entry system that can control functions of a vehicle, the system comprising:
   a transceiver;
   a processor based controller, operatively connected to the transceiver;
   a remote device configured to wirelessly communicate with the controller via the transceiver, the controller configured to:
      predefine one or more substantially concentric radio frequency authorization zones around the controller that includes at least a first zone and a second zone, a boundary of the second zone being predefined as closer around the controller than a boundary of the first zone,
      instruct the transceiver to transmit a polling signal, which can be received by the remote device within the one or more substantially concentric authorization zones, with different polling intervals for each of the first zone and the second zone,
      instruct the transceiver to receive a verification signal from the remote device that the controller can use to authenticate an access code of the remote device and determine a location of the remote device within the first zone or the second zone, and
      selectively enable one or more of the vehicle functions when the controller determines the remote device is located outside of the second zone.

2. The vehicle remote keyless entry system of claim 1, wherein the controller is configured to instruct the transceiver to change the interval of the polling signal to a first random interval within the first zone and a second random interval within the second zone.

3. The vehicle remote keyless entry system of claim 1, wherein the controller is configured to receive the verification signal from the remote device at a corresponding transmission interval as the polling signal, and upon verification of the corresponding transmission interval of the verification signal, verify an identity of the remote device.

4. The vehicle remote keyless entry system of claim 1, wherein the controller is configured to receive a verification signal from the remote device that varies in output power according to a predetermined schedule.

5. The vehicle remote keyless entry system of claim 4, wherein the controller is configured to compare the power variations of the verification signal to a predetermined power variation schedule for the verification signal, and upon verification of the predetermined power variation of the verification signal, verify an identity of the remote device.

6. The vehicle remote keyless entry system of claim 4, wherein the controller is configured to receive the verification signal from the remote device that increases in output power according to a predetermined schedule as the remote device moves closer to the controller.

7. The vehicle remote keyless entry system of claim 1, wherein the controller is configured to define the second zone as substantially concentric around the controller as a low radio frequency zone and configure the first zone as substantially concentric around the controller as a radio frequency zone that has a higher frequency than the second zone.

8. The vehicle remote keyless entry system of claim 1, wherein the controller is configured to selectively disable all vehicle functions that are controlled by the remote device when the remote device transmits the verification signal from the first zone.

9. The vehicle remote keyless entry system of claim 1, wherein the controller is configured to divide at least one of the first zone and the second zone into two or more sectors.

10. The vehicle remote keyless entry system of claim 9, wherein the controller is further configured to determine a location of the remote device within one of the sectors and selectively enable vehicle functions related to the sector location of the remote device and selectively disable vehicle functions related to one or more other sectors.

11. A vehicle, comprising:
   at least one closure that includes at least one locking device configured to selectively lock and unlock the closure; and
   a remote keyless entry system that can control functions of a vehicle, the remote keyless entry system including:
      a transceiver;
      a processor based controller, operatively connected to the transceiver;
      a remote device configured to wirelessly communicate with the controller via the transceiver, the controller configured to:
         predefine one or more substantially concentric radio frequency authorization zones around the controller that includes at least a first zone and a second zone, a boundary of the second zone being predefined as closer around the controller than a boundary of the first zone,
         instruct the transceiver to transmit a polling signal, which can be received by the remote device within the one or more substantially concentric authorization zones, with different polling intervals for each of the first zone and the second zone,
         instruct the transceiver to receive a verification signal from the remote device that the controller can use to authenticate an access code of the remote device and determine a location of the remote device within the first zone or the second zone, and
         selectively enable one or more of the vehicle functions when the controller determines the remote device is located outside of the second zone.

12. The vehicle of claim 11, wherein the controller is configured to instruct the transceiver to change the interval of the polling signal to a first random interval within the first zone and a second random interval within the second zone.

13. The vehicle of claim 11, wherein the controller is configured to:
   receive a verification signal from the remote device that varies in output power according to a predetermined schedule,
   compare the power variations of the verification signal to a predetermined power variation schedule for the verification signal, and
   upon verification of the predetermined power variation of the verification signal, verify an identity of the remote device.

14. The vehicle of claim 11, wherein the controller is configured to selectively disable all vehicle functions that are controlled by the remote device when the remote device transmits the verification signal from the first zone.

15. The vehicle of claim 11, wherein the controller is configured to:
   divide at least one of the first zone and the second zone into two or more sectors,
   determine a location of the remote device within one of the sectors, and
   selectively enable vehicle functions related to the sector location of the remote device and selectively disable vehicle functions related to one or more other sectors.

16. A method of operating a remote keyless entry system for a vehicle, the method comprising:
   defining at least a first authorization zone and a second authorization zone around a controller, the second authorization zone being defined as a substantially concentric second area around the controller, and the first authorization zone being defined as a substantially concentric first area around the second authorization zone;
   transmitting a first polling signal for reception by a remote device at a first frequency into at least a portion of the first authorization zone;
   receiving, from the remote device, a first verification signal in response to the first polling signal if the remote device is in at least the portion of the first authorization zone;
   transmitting a second polling signal for reception by the remote device at a second frequency into at least a portion of the second authorization zone;
   receiving, from the remote device, a second verification signal in response to the second polling signal if the remote device is in at least the portion of the second authorization zone;
   selectively enabling at least a first vehicle function when the first verification signal is validated; and
   selectively enabling at least a second vehicle function when the second verification signal is validated.

17. The method of claim 16, wherein the first polling signal is transmitted at a first patterned polling interval and the second polling signal is transmitted at a second patterned polling interval.

18. The method of claim 16, further comprising:
   transmitting, by the remote device, the one of the first verification signal and the second verification signal using a varying output power pattern.

19. The method of claim 11, further comprising:
   dividing at least one of the first authorization zone and the second authorization zone into a plurality of sectors; and
   assigning one or more apportioned functions of the at least first vehicle function or the at least second vehicle function to the plurality of sectors.

20. The method of claim 19, further comprising:
   selectively enabling the one or more apportioned functions assigned to the plurality of sectors when one of the first verification signal and the second verification signal is validated from one of the plurality of sectors.

* * * * *